United States Patent
Fontana, Jr. et al.

(10) Patent No.: US 8,035,988 B2
(45) Date of Patent: Oct. 11, 2011

(54) METHOD AND DEVICE FOR REPEATABLE SHORTING AND UNSHORTING OF MICRO-ELECTRICAL CIRCUITS

(75) Inventors: Robert E. Fontana, Jr., San Jose, CA (US); Sergey Kiselev, Moscow (RU); Edward Hin Pong Lee, San Jose, CA (US); Kenneth Donald Mackay, St. Martin le Vinoux (FR); Surya Narayan Pattanaik, San Jose, CA (US); Chie Ching Poon, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1151 days.

(21) Appl. No.: 11/763,962

(22) Filed: Jun. 15, 2007

(65) Prior Publication Data
US 2008/0310055 A1 Dec. 18, 2008

(51) Int. Cl.
*H05K 9/00* (2006.01)
(52) U.S. Cl. .......................... 361/816; 361/764; 361/767
(58) Field of Classification Search .......... 361/760–767; 360/323–350
See application file for complete search history.

(56) References Cited

U.S. PATENT DOCUMENTS

| | | | |
|---|---|---|---|
| 4,897,006 A | 1/1990 | Blin | |
| 5,699,212 A * | 12/1997 | Erpelding et al. | 360/245.8 |
| 6,146,813 A | 11/2000 | Girard et al. | |
| 6,158,108 A * | 12/2000 | Seagle | 29/603.14 |
| 6,805,918 B2 | 10/2004 | Auyeung et al. | |
| 2002/0100607 A1 | 8/2002 | Girard et al. | |
| 2005/0054121 A1 | 3/2005 | Handy et al. | |
| 2005/0191448 A1 | 9/2005 | Suh et al. | |
| 2006/0044702 A1 * | 3/2006 | Ding et al. | 360/323 |

OTHER PUBLICATIONS

K.M.A. Rahman, D.N. Wells and M.T. Duignan, Laser Direct-Write of Materials for Microelectronics Applications, presented at Symposium V: Materials Development for Direct Write Technologies (Materials Research Society Spring 2000 Program), Apr. 26, 2000, San Francisco, CA.

* cited by examiner

*Primary Examiner* — Tuan T Dinh
(74) *Attorney, Agent, or Firm* — Patterson & Sheridan, LLP

(57) ABSTRACT

The present invention provides methods and systems for repeatably creating and severing a short circuit to protect an electronic component from ESD. A short circuit may be formed between read sensor pads of a read sensor by depositing a shorting material on a magnetic head using a Laser Induced Forward Transfer (LIFT) process. The short circuit may be unshorted using a laser scan configured to sever the shorting material. In one embodiment, a shorting station may be provided to prevent spreading of the shorting material to undesired areas of the electronic component.

20 Claims, 7 Drawing Sheets

METHOD AND DEVICE FOR REPEATABLE SHORTING AND UNSHORTING OF MICRO-ELECTRICAL CIRCUITS

BACKGROUND OF THE INVENTION

1. Field of the Invention

Embodiments of the present invention generally relate to methods and systems for protecting electronic components from Electrostatic Discharge (ESD), and more specifically to methods and systems for repeatably creating and severing a short circuit to protect the electronic component from ESD.

2. Description of the Related Art

Magnetic head-based systems have been widely accepted in the computer industry as a cost-effective form of data storage. In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk by a suspension assembly which in turn is attached to an actuator arm. As the magnetic disk rotates at operating speed, the moving air generated by the rotating disk in conjunction with the physical design of the slider lifts the magnetic head, allowing it to glide or "fly" slightly above and over the disk surface on a cushion of air, referred to as an air bearing.

Magnetoresistive (MR) sensors are particularly useful as read elements in magnetic heads, used in the data storage industry for high data recording densities. Two examples of MR materials used in the storage industry are anisotropic magnetoresistive (AMR) and giant magnetoresistive (GMR). MR and GMR sensors, the latter also known as spin valves, are deposited as small and thin multi-layered sheet resistors on a structural substrate. The sheet resistors can be coupled to external devices by contact to metal pads which are electrically connected to the sheet resistors. MR sensors provide a high output signal which is not directly related to the head velocity as in the case of inductive read heads. Another type of magnetic device currently under development is a magnetic tunnel junction (MTJ) device. The MTJ device has potential applications as a memory cell and as a magnetic field sensor.

To achieve the high area densities required by the data storage industry, the sensors are made with commensurately small dimensions. The smaller the dimensions, the more sensitive the thin sheet resistors become to damage from spurious current or voltage spike.

A major problem that is encountered during manufacturing, handling and use of MR sheet resistors as magnetic sensors is the buildup of electrostatic charges on the various elements of a head or other objects which come into contact with the sensors, particularly sensors of the thin film type, and the accompanying spurious discharge of the static electricity thus generated. Static charges may be externally produced and accumulate on instruments used by persons performing head manufacturing or testing function. These static charges may be discharged through the head causing excessive heating of the sensitive sensors which result in physical or magnetic damage to the sensors. This phenomenon is generally known as electrostatic discharge. A discharge of only a few volts can destroy or severely damage the MR sensor. Such a discharge can occur by contact with or close proximity to a person, plastic involved in the fabrication, or components of a magnetic medium drive.

As described above, when an MR head is exposed to voltage or current inputs which are larger than that intended under normal operating conditions, the sensor and other parts of the head may be damaged. This sensitivity to electrical damage is particularly severe for MR read sensors because of their relatively small physical size. For example, an MR sensor used for high recording densities for a magnetic disk drive (on the order of 100 Gbits/in$^2$) is patterned as resistive sheets of MR and accompanying materials, and has a combined thickness for the sensor sheets on the order of 400 Angstroms with a length and height both on the order of 100 nm with the length and thickness of the MR sensor exposed at the air bearing surface of the MR head, while the height is buried in the body of the head.

Discharge currents of tens of milliamps through such a small resistor can cause severe damage or complete destruction of the MR sensor. The nature of the damage which may be experienced by an MR sensor varies significantly, including complete destruction of the sensor via melting and evaporation, oxidation of materials at the air bearing surface (ABS), generation of shorts via electrical breakdown, and milder forms of magnetic or physical damage in which the head performance may be degraded. Short time current or voltage pulses which cause extensive physical damage to a sensor are termed electrostatic discharge (ESD) pulses. Short time pulses which do not result in noticeable physical damage (resistance changes), but which alter the magnetic response or stability of the sensors due to excessive heating are termed electrical overstress (EOS) pulses.

Several methods for reduction of ESD damage are detailed in U.S. Pat. No. 6,400,534 (resistive shunt), U.S. Pat. No. 5,757,590 (fusible links), U.S. Pat. No. 5,759,428 (laser cutting of a metal short), U.S. Pat. No. 5,748,412 (shunting with anti parallel diode pair), U.S. Pat. No. 5,644,454 (short on the suspension), etc. While each of these methods can provide certain ESD protection, factors such as cost, effectiveness in terms of variations in ESD transients, extent of protection in slider fabrication, added complexity to manufacturing, etc. have precluded their eventual implementation.

Electrically shorting out the MR sensor, by shorting the two ends of the sensor which connect to external devices, provides the best possible ESD protection. The MR sensor may comprise leads that terminate at a pair of pads which are exposed for connection to drive electronics. A convenient way of protecting the MR sensor from ESD is to interconnect the pads with a thin film conductive line on the exterior surface of the MR head. This shorts the MR circuit, bypassing potential damaging current from electrical discharge.

One problem with this technique is that the head is no longer functional while the short is applied. The short needs to be removed for testing purposes several times during the manufacturing and assembly of a magnetic hard disk drive: at row level, slider level, head-gimbal assembly (HGA) level and at head-stack assembly (HSA) level, and the like. Once the short is removed, for testing or use, the sensors are no longer protected.

Thus, in all of the known methods for providing ESD protection, one common drawback remains. None of these methods can provide the flexibility and effectiveness in ESD protection for the magnetic sensor as often as desired.

Accordingly, a need exists for providing ESD protection that can be applied in a repeatable manner so that the head can be shorted when necessary, and the short severed when desired, such as for testing.

SUMMARY OF THE INVENTION

Embodiments of the present invention generally relate to methods and systems for protecting electronic components from Electrostatic Discharge (ESD), and more specifically to methods and systems for repeatably creating and severing a short circuit to protect the electronic component from ESD.

One embodiment of the invention provides a method for shorting and unshorting an electrical component. The method generally comprises forming a first electrical short between at least one first electrical pad and at least one second electrical pad of the electrical component by depositing a shorting material on a surface of the electrical component using a laser induced forward transfer process, wherein the shorting material short circuits the electrical component. The method further comprises melting the shorting material using a laser to disconnect the first electrical pad and the second electrical pad, and repeatably shorting the electrical component by depositing shorting material as described above and unshorting the electrical component by melting the shorting material as described above.

Another embodiment of the invention provides a method for shorting and unshorting an electrical component. The method generally comprises depositing a shorting material in a shorting station configured to prevent spreading of the shorting material, wherein the shorting material connects at least a first electrical pad of the electrical component to a second electrical pad of the electrical component, thereby shorting the electrical component. The method further comprises scanning a laser beam over the shorting material to melt the shorting material and sever the connection between the first electrical pad and the second electrical pad, thereby unshorting the electrical component.

Yet another embodiment of the invention provides a device, generally comprising an electronic component, at least one first electrical pad and at least one second electrical pad, each electrically coupled with the electronic component, and at least one shorting station coupled with the first electrical pad and the second electrical pad for receiving a shorting material. The at least one shorting station generally comprises a first wall structure and a second wall structure, wherein the first wall structure and the second wall structure are configured to prevent the shorting material from spreading outside the shorting station.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to methods and systems for protecting electronic components from Electrostatic Discharge (ESD), and more specifically to methods and systems for repeatably creating and severing a short circuit to protect the electronic component from ESD. A short circuit may be formed between read sensor pads of a read sensor by depositing a shorting material on a magnetic head using a Laser Induced Forward Transfer (LIFT) process. The short circuit may be unshorted using a laser scan configured to sever the shorting material. In one embodiment, a shorting station may be provided to prevent spreading of the shorting material to undesired areas of the electronic component.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Exemplary System

Figure 1:
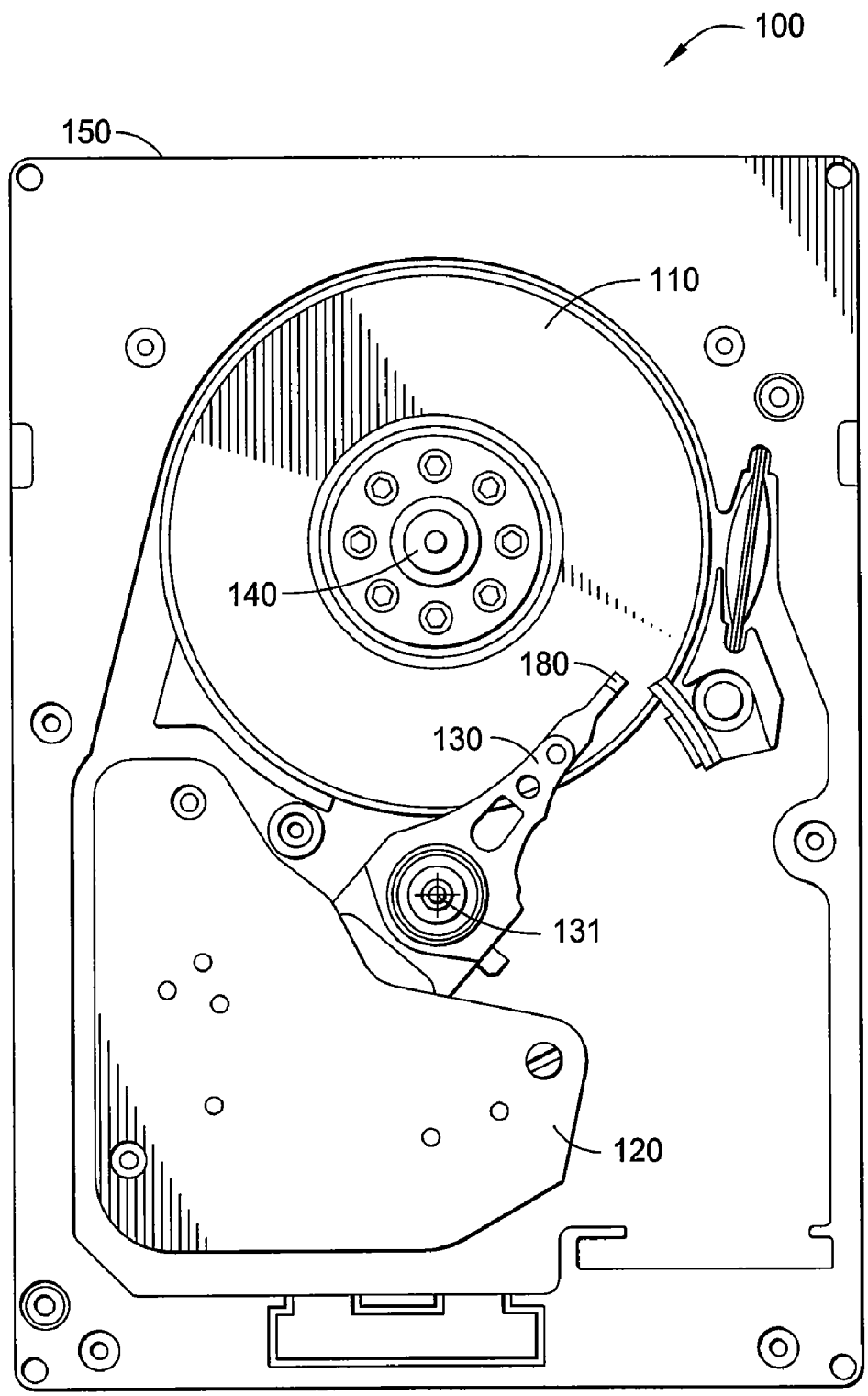
FIG. 1 illustrates an exemplary hard disk drive according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may contain circular tracks of data on both the top and bottom surfaces of the disk. An electromagnetic head, for example head 180, may be positioned on a track. As each disk spins, data may be written and read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

Figure 2:
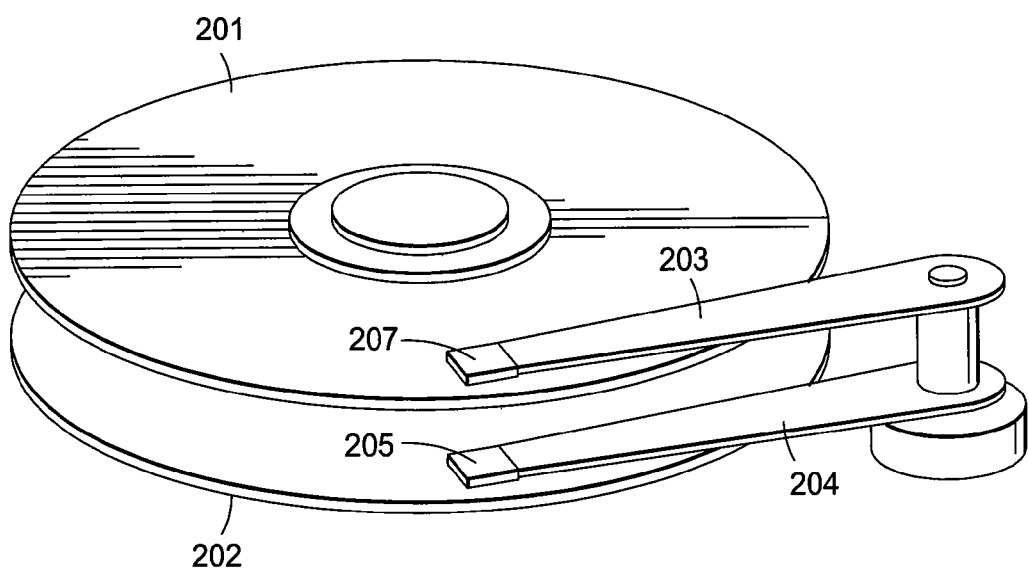
FIG. 2 illustrates a pair of magnetic disks and associated read/write heads according to an embodiment of the invention.

As described above, a plurality of magnetic disks may be stacked vertically in HDD 100. Each disk may have read and write tracks on each side of the disk. Therefore, electromagnetic heads may be placed on both sides of the disk. FIG. 2 illustrates two magnetic disks 201 and 202 that are stacked vertically. Actuator arms 203 and 204 may access data tracks on disks 201 and 202. As illustrated, actuator arm 203 may be coupled with electromagnetic head 207 to access data tracks on the top face of disk 201.

Actuator arm 204 may contain head 205. Head 205 may be configured to access data tracks on the bottom face of disk 201 (not illustrated) and on the top face of disk 202 (illustrated). While two magnetic disks are illustrated in FIG. 2, one skilled in the art will recognize that any number of magnetic disks may be vertically stacked with interleaving actuator arms providing heads to access the top and bottom faces of the disks.

Referring back to FIG. 1, each actuator arm 130 may be coupled to actuator 120. Actuator 120 may be a motor configured to control the swiveling movement of actuator arm 130 to place electromagnetic head 180 on a given data track. In one embodiment, the actuator arms may be connected. Therefore, all the actuator arms 130, and consequently all the electromagnetic heads 180 may move together.

Spindle motor 140 may be configured to rotate the magnetic disks at a predetermined rate. For example, the spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

Figure 3:
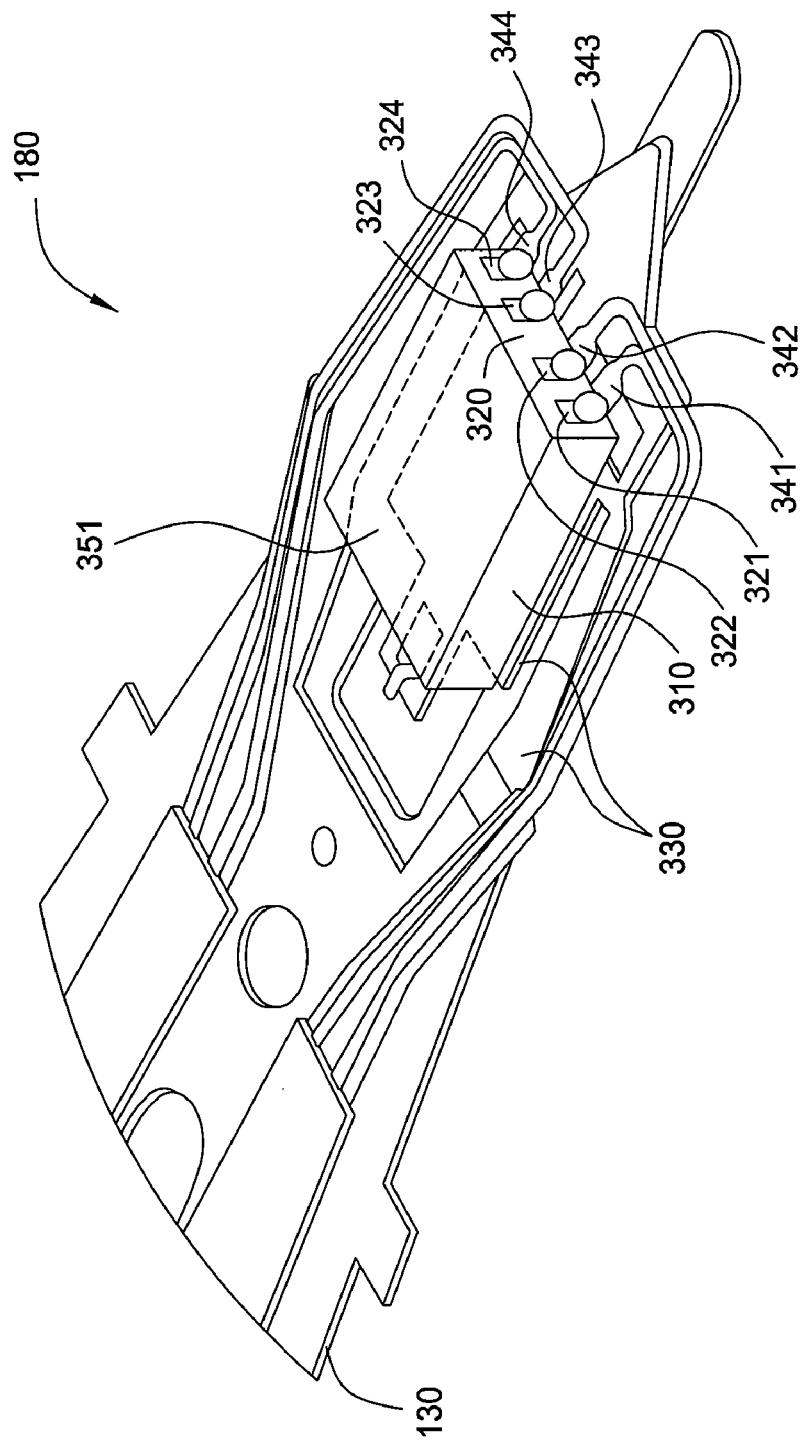
FIG. 3 illustrates a detailed view of a magnetic head according to an embodiment of the invention.

FIG. 3 illustrates a more detailed view of an electromagnetic head assembly 180, according to an embodiment of the invention. As illustrated in FIG. 3, head 180 may comprise a slider 310 having a magnetic head portion 320 formed on the slider 310. Head 180 may be mechanically affixed to a flexure 330 of the actuator arm 130, as illustrated in FIG. 3. In this respect, when the slider glides or flies over the magnetic disk, the airbearing surface 351 may be directly above the magnetic disk surface Magnetic head portion 320 may include a one or more write sensor pads and one or more read sensor pads. For example, two write sensor pads 321 and 322, and two read sensor pads 323 and 324 are illustrated in FIG. 3.

Each of write sensor pads 321 and 322, and read sensor pads 323 and 324 may be coupled with corresponding suspension leads 341-344, as illustrated in FIG. 3. Suspension leads 341-344 may be configured to carry an electric current to and from the write sensor pads and the read sensor pads.

Figure 4:
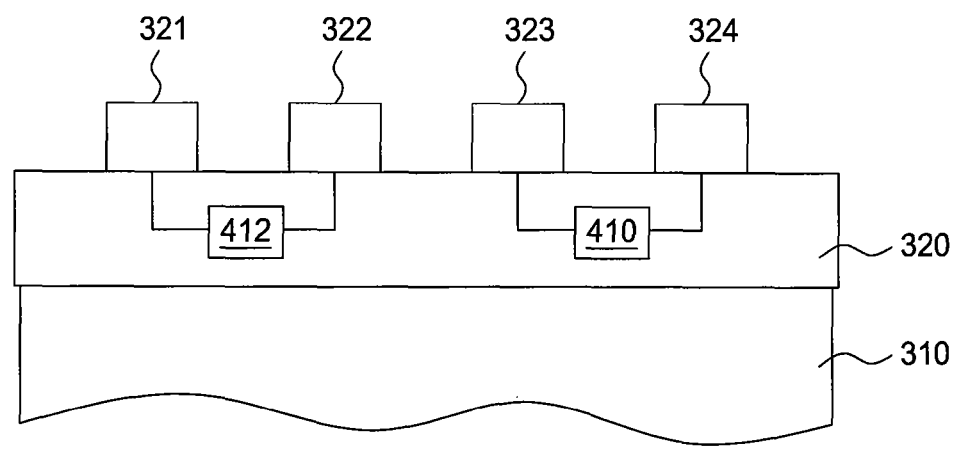
FIG. 4 illustrates a cross sectional view of a magnetic head according to an embodiment of the invention.

FIG. 4 illustrates a cross sectional view of head 180, in a plane parallel to the disk surface 110 (FIG. 1), according to an embodiment of the invention. As discussed above, head 180 may include a magnetic head portion 320 formed on a slider 310. Magnetic head portion 320 includes write sensor pads 321 and 322, and read sensor pads 323 and 324. The read sensor pads 323 and 324 may be electrically coupled with a read sensor 410, as illustrated in FIG. 4. In one embodiment of the invention, read sensor 410 may be a spin valve. However, any other reasonable read sensor may also be used. The write sensor pads 321 and 322 may be electrically coupled with a write sensor 412. Both read sensor 410 and write sensor 412 may be constructed in head 180 such that they are in close proximity of the magnetic disk when the slider 310 glides or flies over a magnetic disk 110.

While writing to a magnetic disk 110, an electric field between the write sensor pads 321 and 322 may be adjusted to write data. An electric current through the write sensor pads 321 and 322 in the head 180 may alter the magnetic field at the write sensor 412. The value of the current may depend on the value of data to be written. Different current values may generate different magnetic fields. In one embodiment, a strong magnetic field at the write sensor 412 may represent a logic "1", while a relatively weaker magnetic field may represent a logic "0". When placed in close proximity over a magnetic disk 110, the write sensor 412 may magnetize a portion of the surface of the magnetic disk 110, thereby writing data to the magnetic disk.

Read sensor 410 may be configured to sense a previously magnetized surface of a magnetic disk 110 to read data. For example, a sense current may be applied between read pads 323 and 324 and passed through the read sensor 410. A change in magnetic field near the read sensor 410 may alter the resistance of read sensor 410, thereby affecting the sense current and a voltage measurement in the read sensor 410. The voltage measurements in the read sensor may be correlated to logical values, such as, for example, logic "0" and logic "1".

A read sensor 410 may have a relatively low resistance. For example, in some embodiments, the resistance of the read sensor 410 may be around 50-60 ohms. Furthermore, with continually decreasing device sizes, the components of read sensor 410 may be very small. Therefore, read sensor 410 may be prone to damage from Electrostatic Discharge (ESD). For example, during fabrication, assembly, testing, and the like, ESD may cause a large current to pass through read sensor 410 through the exposed read sensor pads 323 and 324 and damage the read sensor, for example, by physically and magnetically altering components of the read sensor. In one embodiment of the invention, a short circuit may be formed between the read sensor pads 323 and 324 to prevent ESD current from passing through and damaging the read sensor 410.

However, the short circuit may have to be removed, for example, to perform one or more testing operations on the magnetic head 180. Embodiments of the invention provide methods for shorting the read sensor pads to provide protection from ESD when desired and allowing the short to be removed, for example, during one or more test operations. Furthermore, the shorting and unshorting may be performed repeatably to allow flexibility during fabrication, assembly, and testing of the magnetic head.

Shorting and Unshorting of Read Sensor Pads

Figure 5A:
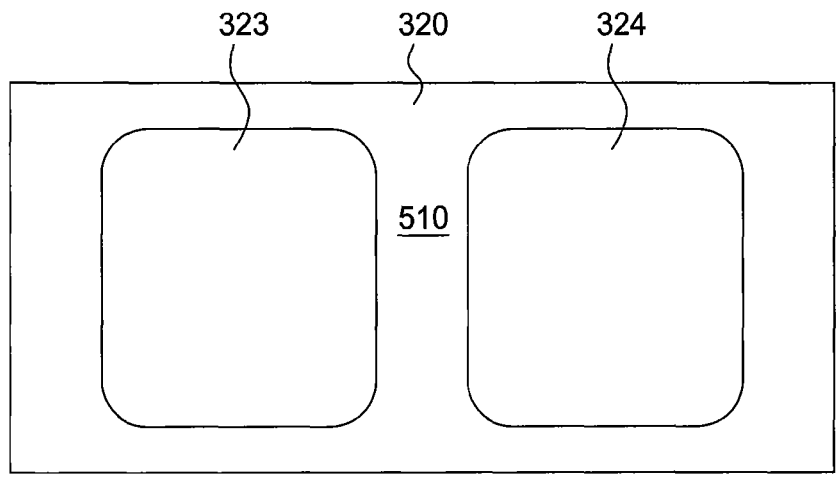
FIGS. 5A and B illustrate shorting of read sensor pads according to an embodiment of the invention.
Figure 5B:
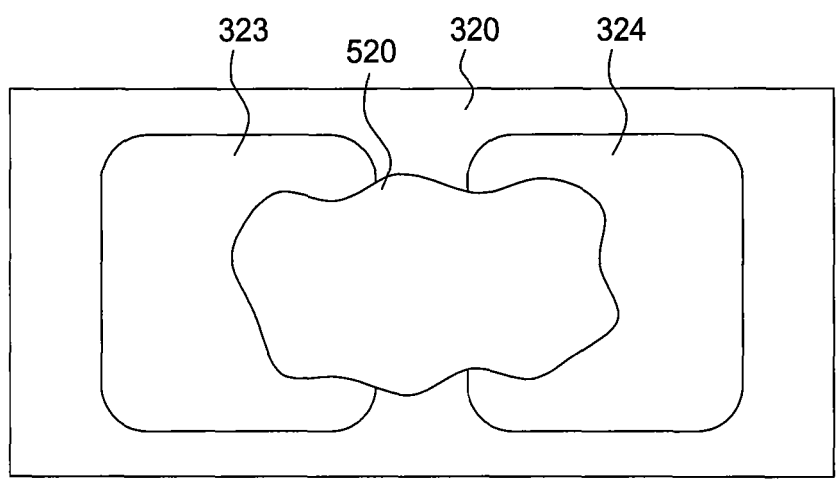

In one embodiment of the invention, read sensor pads 323 and 324 may be short circuited by depositing a shorting material on the magnetic head 320 to connect read sensor pads 323 and 324. FIGS. 5A-B illustrate a top view of the magnetic head 320 before and after the shorting material is deposited thereon. As illustrated in FIG. 5A, a gap 510 may exist between the read sensor pads 323 and 324. A shorting material 520 may be deposited in the gap region 510 and over a portion of the read sensor pads 323 and 324 to short circuit the read sensor pads, as illustrated in FIG. 5B.

Figure 6:
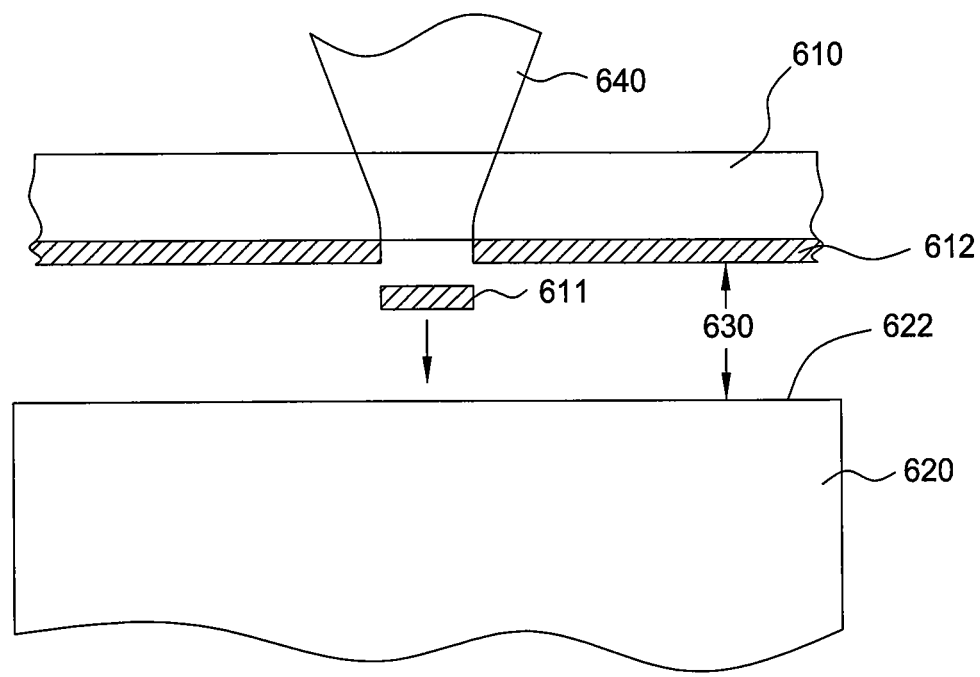
FIG. 6 illustrates a Laser Induced Forward Transfer (LIFT) process according to an embodiment of the invention.

In one embodiment of the invention, the shorting material may be deposited on the magnetic head 320 using a Laser Induced Forward Transfer (LIFT) process. FIG. 6 illustrates LIFT according to an embodiment of the invention. As illustrated in FIG. 6, the LIFT process may involve placing a donor substrate 610 over a receiving substrate 620. Donor substrate 610 and receiving substrate 620 may be separated by gap 630. The donor substrate may be covered with a thin film of shorting material 612 on the surface facing receiving substrate 620. In one embodiment, donor substrate 610 may be optically transparent at a wavelength of the incident laser beam 640 for LIFT. The laser beam 640 may be focused through the donor substrate 610 on the shorting material 612. Upon energizing the laser beam, portion 611 of the shorting material 612 may be melted, dislodged and propelled through the space 630 and deposited on the receiving substrate 620. If a pulsed laser is used, donor substrate 610 may be translated to provide fresh shorting material 612 before the next laser pulse arrives. If a continuous wave laser is used, donor substrate 612 may be continuously translated to provide fresh shorting material 612 for the laser beam to transfer.

For example, in one embodiment of the invention, pulsing the focused laser beam 640 through the donor substrate 610 may cause a top region of the portion 611 of the shorting material to vaporize. The vaporized part of portion 611 may exert pressure on the non-vaporized part of portion 611 and cause the portion 611 to dislodge from the donor substrate 610. The dislodged portion 611 may then deposit and adhere to the top surface 622 of the receiving substrate 620.

In one embodiment of the invention, the receiving substrate 620 may be a surface comprising the read sensor pads 323 and 324 on a magnetic head 320 and the donor substrate 610 may be glass coated with a suitable shorting material. The laser may be a pulsed laser of wavelength 1064 nm. The LIFT process may be used to deposit the shorting material along the gap region 510 between read sensor pads 323 and 324 to form a short circuit, such as, for example, the short circuit illustrated in FIG. 5B.

After the read sensor pads 323 and 324 have been shorted, it may become necessary to repeatably short and unshort the read sensor pads several times. For example, the magnetic head may be tested several times during fabrication and assembly. For example a first test of the magnetic head 180 may be performed on a wafer on which the magnetic head is formed. Thereafter, the magnetic head may be cut from the wafer and affixed to an actuator arm 130. A second test of the magnetic head may be performed after the magnetic head is affixed to the actuator arm 130. The magnetic head may need protection from ESD in the intervals between a first and second test. Therefore, the read sensor pads 323 and 324 may be shorted during such intervals and unshorted prior to testing.

Figure 7:
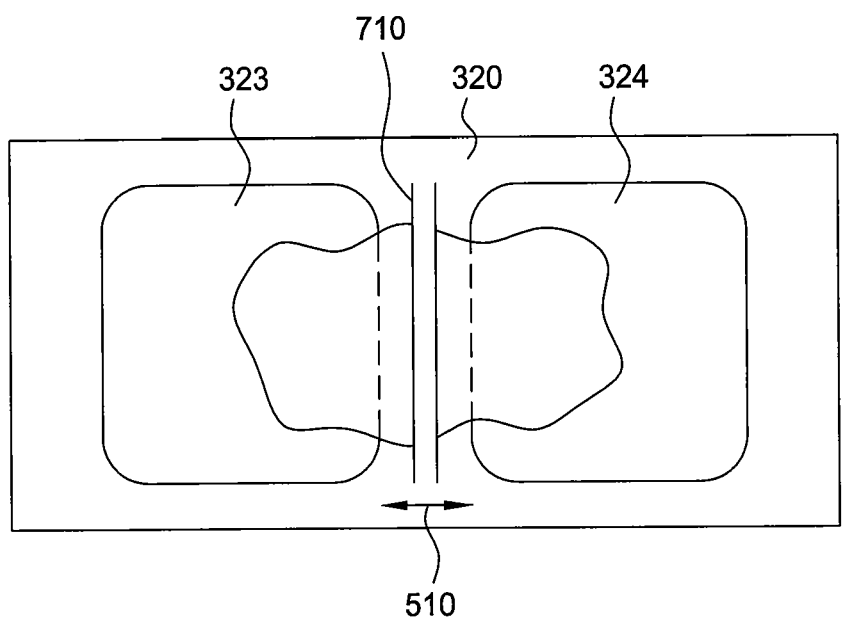
FIG. 7 illustrates unshorting of shorted read sensor pads according to an embodiment of the invention.

In one embodiment of the invention, the read sensor pads 323 and 324 may be unshorted by scanning a laser beam along a region where the shorting material has been deposited. For example, a laser beam may be scanned along the gap region 510 (see FIG. 5) between the read sensor pads. FIG. 7 illustrates the unshorting of the read sensor pads 323 and 324 according to an embodiment of the invention. As illustrated in FIG. 7, a laser may be scanned along the gap region 510 between the read sensor pads, thereby causing a portion of the shorting material to melt and separate to form a region 710 that disconnects the read sensor pads 323 and 324.

The above described procedures may be repeatedly performed to repeatedly short and unshort the read sensor pads 323 and 324. For example, if shorting is desired, more shorting material may be deposited on the magnetic head 320 to fill the gap 710 formed during unshorting with the shorting material. Thereafter, if unshorting is desired again, a laser beam may simply be scanned along the gap 510 as described above to recreate the region 710.

In one embodiment of the invention, the shorting material used may be suitably conductive metals such as gold, silver, chromium and others, and metallic alloys. Among metallic alloys, solder alloys may be particularly attractive. In the shorting of an electrical circuit, the use of a solder alloy that is already in use on the circuit may also ensure the benign nature of the material. Solder alloys are typically a composition of metals such as tin, silver, copper, bismuth, indium, and antimony in various amounts. For example, in a particular embodiment, the shorting material may be a tin alloy comprising approximately 0.75% Cu, approximately 2% Bi, approximately 3% Ag, and Sn. A tin alloy may provide several advantages. For example, a tin alloy has a relatively low melting point. Therefore, the LIFT process and the laser scan unshorting process may be performed with relatively low energy lasers, the use of which reduces tooling and operational costs. Another advantage of using a tin based shorting material is that tin easily wets on common metals used as electrical connects such as gold, silver, nickel, copper and others and solidifies with good adhesion to these metals. It is particular attractive to apply it on gold which is typically used to form the read sensor pads 323 and 324. Yet another advantage of using tin alloy is that it is already in use for bonding electric leads to the sensor pads, therefore, it assures compatibility within a disk driver enclosure in which cleanliness is of utmost concern.

Yet another advantage of tin alloys is that it may form a relatively low resistance connection between the read sensor pads 323 and 324, thereby short circuiting the read sensor 410. In some embodiments, the resistance between the read sensor pads 323 and 324 may be less than 1 ohm after deposition of a tin based shorting material. In these embodiments, the laser may be operated in the pulsed mode. Each scan may contain ten laser pulses along the gap region 510, i.e., ten LIFT transfers. In one embodiment, to reach low resistance values, 100 repeat scans may be used. Because the tin based shorting material has a much lower resistance in comparison to the read sensor 410, most of the ESD current may flow through the shorting material instead of the read sensor 410, thereby preventing damage of the read sensor 410.

Figure 8:
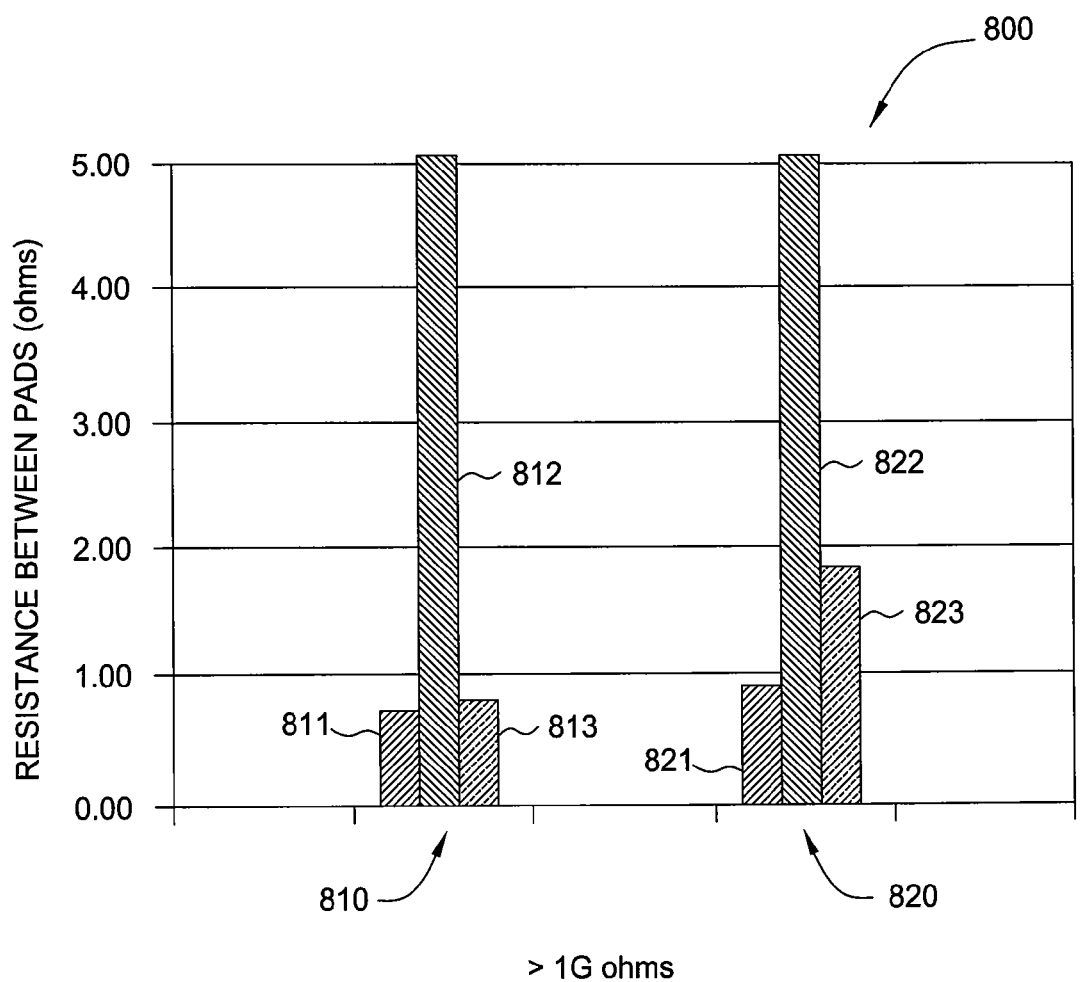
FIG. 8 is a bar graph illustrating resistance measurements depicting repeatability of shorting and unshorting according to an embodiment of the invention.

FIG. 8 illustrates results of an experiment illustrating the repeatability of shorting and unshorting as discussed above. Specifically, FIG. 8 illustrates a bar graph 800 depicting the resistance measured across the read sensor pads 323 and 324 of two magnetic head devices 810 and 820. Each of the magnetic head devices 810 and 820 were shorted, unshorted, and then shorted again. Resistance between the read sensor pads 323 and 324 was measured after the first short, the unshort, and the second short.

For example, for device 810, bar 811 illustrates the resistance after the first short, bar 812 illustrates the resistance after the unshort and bar 813 illustrates the resistance after the second short. Similarly, for device 820, bar 821 illustrates the resistance after the first short, bar 822 illustrates the resistance after the unshort and bar 823 illustrates the resistance after the second short.

As illustrated in bar graph 800, shorting the read sensor pads for magnetic heads 810 and 820 drops the resistance between the pads to a value at or near 1 ohm as illustrated by bars 811, 813, 821, and 823. Unshorting the magnetic heads 810 and 820 increases the resistance between the read sensor pads to greater than 1 giga-ohms because of the open circuit.

Shorting and Unshorting Using a Shorting Station

In some embodiments of the invention, it may be desirable to tightly control the region in which the shorting material is deposited to prevent contamination of other regions of the magnetic head 320. For example, repeated deposition and melting of shorting material on the magnetic head may increase the risk of the shorting material spreading to undesired locations. Therefore, in one embodiment of the invention, a shorting station as described below may be used to prevent excessive spreading of the shorting material.

Figure 9:
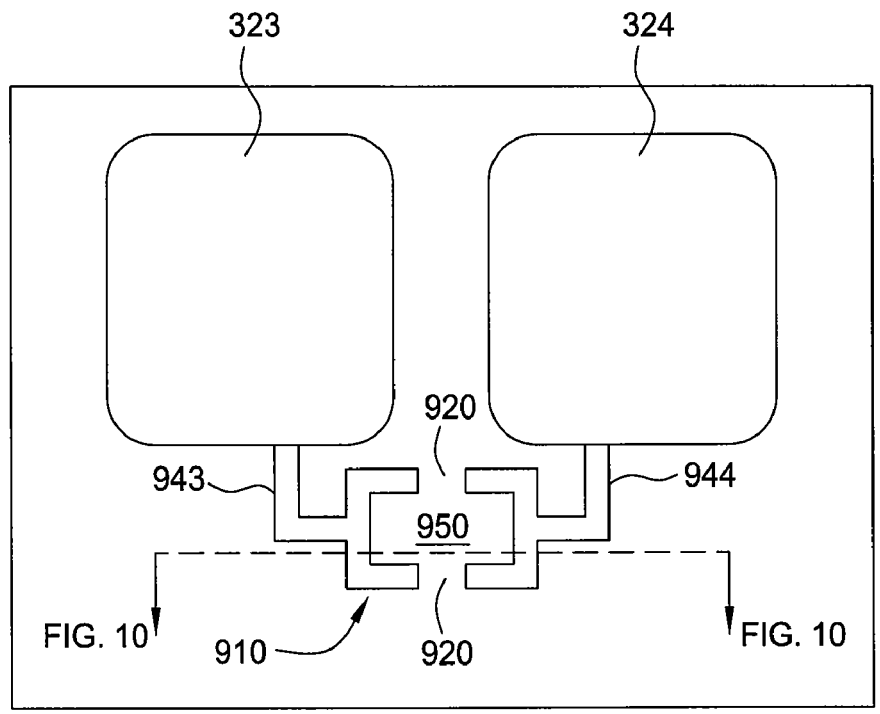
FIG. 9 illustrates a shorting station according to an embodiment of the invention.

FIG. 9 illustrates a shorting station 910, according to an embodiment of the invention. The shorting station 910 may be connected to the read sensor pads 323 and 324 by associated leads 943 and 944. As illustrated in FIG. 9, shorting station 910 may be a box shaped fence structure including one or more openings 920 therein. In one embodiment of the invention, the openings may be at least 3 microns in width. The thickness of the fence defining the shorting station may be selected to make the resistance of the short circuit relatively small, for example, less than 1 ohm.

In one embodiment of the invention, shorting the read sensor pads 323 and 324 may involve depositing shorting material within the region 950 enclosed by the box shaped shorting station 910. The openings 920 of shorting station 910 may be provided to allow a laser scan for unshorting the read sensor pads 323 and 324.

Figure 10:
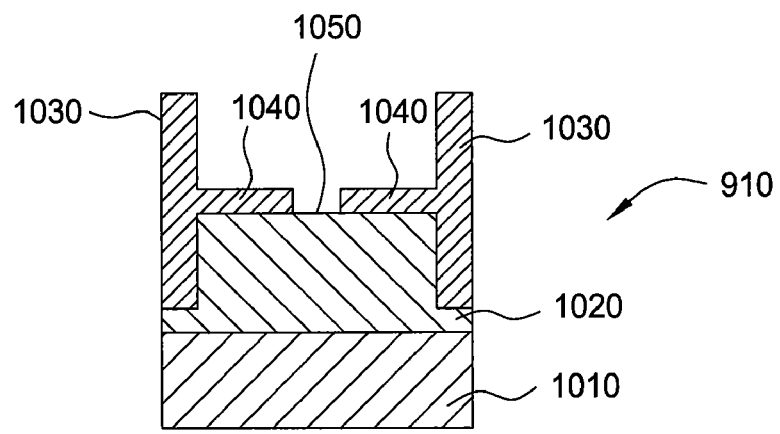
FIG. 10 illustrates a cross section of a shorting station according to an embodiment of the invention.

FIG. 10 illustrates a cross sectional view of the shorting station 910 along the cross sectional line AA illustrated in FIG. 9. As illustrated in FIG. 10, shorting station 910 may be formed on a nonconductive substrate 1010. In one embodiment of the invention, substrate 1010 may be made from alumina. Shorting station 910 may include a seed layer 1020. In one embodiment of the invention, seed layer 1020 may be made from a suitable conductive material, for example, Nickel-Iron (NiFe). Other metals used as a seed layer are tatalum, chromium, copper, and rhodium.

Shorting station 910 may also include wall structures 1030. The wall structures 1030 may define the boxed area defining the shorting station 910. The wall structure may be sufficiently high to contain shorting material deposited within the shorting station 910 and prevent spreading of the shorting material to other areas of the magnetic head 320. In one embodiment of the invention, the wall structures 1030 may be around a few micrometers high.

Shorting station 910 may also include a floor structure 1040. Floor structure 1040 may be relatively thin compared to the wall structure 1030. For example, in one embodiment, the floor structure 1040 may comprise a conductive metal of a thickness of around 1 micron over the seed layer 1020. In one embodiment the floor structure 1040 may be made from Gold. The portion of the floor along an axis through the openings 920 is void of metal, forming a path 1050 and exposing the substrate 1010. In this respect, the leads 943 and 944 may initially be unshorted. The metal-free open path may be used for unshorting in a latter process. In another embodiment, the floor structure 1040 may be entirely covered with a conductive metal, for example, NiFe, as illustrated in FIG. 10. Therefore, the leads 943 and 944 may initially be shorted.

To unshort the read sensor pads 323 and 324 when a seed layer 1020 that forms the entire floor structure 1040 is present, a laser beam may be scanned through the openings 920 and along the path 1050 to cut the seed layer 1020. The thickness of the seed layer 1020 may be pre-selected to facilitate the cutting of the seed layer. For example, in one embodiment, the seed layer may be around a few thousand angstroms in thickness. The cutting of NiFe seed layers is discussed in greater detail in U.S. Pat. No. 5,759,428.

To create a short circuit for the sensor pads 323 and 324, a suitable shorting material, for example, a tin alloy, may be deposited by the LIFT process in the region 950 of shorting station 910. The presence of fence 1030 around shorting station 910 prevents the spreading of the shorting material. To unshort the read sensor pads 323 and 324 when shorting material has been previously deposited, a laser beam may be scanned through the openings 920 and along the path 1050.

In one embodiment of the invention, the floor structure 1040 may serve as a reservoir of shorting material. The presence of a conductive metal, for example, gold, promotes wetting and improves adhesion of solder. Therefore, subsequent shorting steps may involve performing a laser scan within the confines of the shorting station to melt the shorting material and form a contiguous film that adheres well to the floor structure. The shorting material, as a result, remains within the shorting station and the shorting station becomes a reservoir of shorting material even after a plurality of shorting and unshorting steps. The risk of contaminating other areas of the magnetic head 320 is therefore greatly reduced.

In some embodiments, additional shorting material may be deposited in the shorting station to recreate the short. The wall structures 1030 may be sufficiently high to contain shorting material deposited in multiple LIFT procedures and prevent the spread of the shorting material to undesirable areas.

While shorting station 910 is illustrated having two openings 920 forming two distinct wall structures 1030 herein, embodiments of the invention may include any number of openings 920 forming multiple laser cutting paths. For example, in one embodiment, shorting station may include four openings 920, thereby forming four distinct wall structures 1030. Each of the four wall structures 1030 may be electrically coupled with a respective device or pad. Two of the four openings 920 may lie along a first laser cutting path and the remaining two of the openings 920 may lie along a second laser cutting path. Therefore, any number of electrical pads and devices may be coupled using a single shorting station.

In other embodiments, multiple shorting stations may be placed in series for, for example, floor material change, location change for shorting, change of number of leads for shorting and unshorting, etc.

CONCLUSION

By allowing a shorting material to be deposited and severed between read sensor pads, embodiments of the invention allow repeatable shorting and unshorting of the read sensor pads during various stages of manufacturing, assembly, and testing of a read sensor, thereby providing a flexible solution to protect the read sensor from ESD during the various stages. Furthermore, embodiments of the invention provide a shorting station to prevent spreading of the shorting material to undesired locations.

While the foregoing is directed to embodiments of the present invention, other and further embodiments of the invention may be devised without departing from the basic scope thereof, and the scope thereof is determined by the claims that follow.

What is claimed is:

1. A device, comprising:
   an electronic component;
   at least one first electrical pad and at least one second electrical pad, each electrically coupled with the electronic component; and
   at least one shorting station coupled with the first electrical pad and the second electrical pad for receiving a shorting material, the at least one shorting station comprising a first wall structure and a second wall structure, wherein the first wall structure and the second wall structure are configured to inhibit the shorting material from spreading outside the shorting station,
   wherein the first wall structure and the second wall structure are formed on a conductive seed layer, wherein the conductive seed layer electrically connects the first electrical pad and the second electrical pad, thereby short circuiting the electronic component.

2. The device of claim 1, wherein the seed layer is made from one of nickel-iron (NiFe), tantalum, chromium, copper and rhodium.

3. The device of claim 1, wherein the shorting station comprises a floor structure formed between the first wall structure and the second wall structure and disposed on the seed layer, the floor structure comprising a path for receiving a laser beam configured to cut the seed layer and disconnect the first electrical pad from the second electrical pad.

4. The device of claim 1, wherein the shorting material is made from one of a solder alloy, gold, silver, nickel and chromium.

5. The device of claim 1, further comprising the shorting material deposited within the shorting station, wherein the shorting material is configured to electrically couple the first electrical pad to the second electrical pad, thereby short circuiting the electrical component.

6. The device of claim 1, wherein the shorting material is deposited within the shorting station using a laser induced forward transfer process.

7. The device of claim 1, wherein the shorting station is configured to receive a laser beam configured to melt the shorting material and disconnect the first electrical pad from the second electrical pad.

8. The device of claim 3, wherein the first wall structure, the second wall structure and the floor structure are made from one of gold, nickel and copper.

9. A device, comprising:
   an electronic component;
   at least one first electrical pad and at least one second electrical pad, each electrically coupled with the electronic component;
   at least one shorting station coupled with the first electrical pad and the second electrical pad for receiving a shorting material, the at least one shorting station comprising a first wall structure and a second wall structure, wherein the first wall structure and the second wall structure are configured to inhibit the shorting material from spreading outside the shorting station;
   a first floor structure coupled to the first wall structure and extending towards the second wall structure; and
   a second floor structure coupled to the second wall and extending towards the first wall structure, wherein an opening between the first and second floor structures provides a path configured to receive a laser beam, the laser beam disconnecting the first electrical pad from the second electrical pad.

10. The device of claim 9, wherein a material comprising the first and second floor structures is different from the shorting material.

11. The device of claim 9, wherein a material comprising the first and second floor structures is the same as a material comprising the first and second wall structures.

12. The device of claim 9, wherein the first and second wall structures and the first and second floor structures are formed on a conductive seed layer, wherein the conductive seed layer electrically connects the first electrical pad and the second electrical pad, thereby short circuiting the electronic component.

13. The device of claim 11, wherein the first and second wall structures and the first and second floor structures are made from one of gold, nickel and copper.

14. A method, comprising:
   providing an electronic component at least one first electrical pad and at least one second electrical pad, each electrically coupled with the electronic component;
   depositing a conductive seed layer that electrically connects the first electrical pad and the second electrical pad, thereby short circuiting the electronic component; and
   depositing at least one shorting station electrically coupled with the first electrical pad and the second electrical pad for receiving a shorting material, the at least one shorting station comprising a first wall structure and a second wall structure, wherein the first wall structure and the second wall structure are configured to inhibit the shorting material from spreading outside the shorting station, and wherein the first wall structure and the second wall structure are deposited on the conductive seed layer.

15. The method of claim 14, wherein the conductive seed layer is made from one of nickel-iron (NiFe), tantalum, chromium, copper and rhodium.

16. The method of claim 14, wherein the shorting station comprises a floor structure formed between the first wall structure and the second wall structure and disposed on the seed layer, the floor structure comprising a path for receiving a laser beam configured to cut the seed layer and disconnect the first electrical pad from the second electrical pad.

17. The method of claim 14, wherein the shorting material is made from one of a solder alloy, gold, silver, nickel and chromium.

18. The method of claim 14, further comprising depositing the shorting material within the shorting station, wherein the shorting material is configured to electrically couple the first electrical pad to the second electrical pad, thereby short circuiting the electrical component.

19. The method of claim 14, wherein the shorting material is deposited within the shorting station using a laser induced forward transfer process.

20. The method of claim 16, wherein the first wall structure, the second wall structure and the floor structure are made from one of gold, nickel and copper.

* * * * *